United States Patent
Liu

(10) Patent No.: US 10,004,350 B1
(45) Date of Patent: Jun. 26, 2018

(54) KNIFE HOLDER

(71) Applicant: Chia-Ming Liu, Douliou (TW)

(72) Inventor: Chia-Ming Liu, Douliou (TW)

( * ) Notice: Subject to any disclaimer, the term of this patent is extended or adjusted under 35 U.S.C. 154(b) by 0 days. days.

(21) Appl. No.: 15/638,436

(22) Filed: Jun. 30, 2017

(30) Foreign Application Priority Data

Mar. 7, 2017 (CN) ..................... 2017 2 0214037 U

(51) Int. Cl.
*A47G 21/14* (2006.01)
*A47J 47/16* (2006.01)

(52) U.S. Cl.
CPC .............. *A47G 21/14* (2013.01); *A47J 47/16* (2013.01)

(58) Field of Classification Search
CPC .................................. A47G 21/14; A47J 47/16
USPC ......................................... 248/37.3; 211/70.7
See application file for complete search history.

(56) References Cited

U.S. PATENT DOCUMENTS

| | | | | |
|---|---|---|---|---|
| 6,375,016 | B1 * | 4/2002 | Stuchlik, III | A47G 21/14 211/162 |
| 6,854,186 | B2 * | 2/2005 | Basden | A47G 21/14 248/37.3 |
| 2003/0038098 | A1 * | 2/2003 | Stuchlik, III | A47G 21/14 211/70.7 |
| 2008/0276465 | A1 * | 11/2008 | Lafleur | A47G 21/14 30/298.4 |
| 2011/0084177 | A1 * | 4/2011 | Curwen | A47G 21/14 248/37.3 |
| 2012/0266468 | A1 * | 10/2012 | Murphy | A47G 21/14 30/298.4 |
| 2012/0324740 | A1 * | 12/2012 | Brough | A47G 21/14 30/298.4 |

FOREIGN PATENT DOCUMENTS

| | | | | |
|---|---|---|---|---|
| DE | 202012011342 | * | 3/2013 | .............. A47J 47/16 |
| GB | 2529430 | * | 2/2016 | .............. A47G 21/14 |
| JP | 10229947 A | * | 9/1998 | .............. A47J 47/16 |

\* cited by examiner

*Primary Examiner* — Michael Safavi
(74) *Attorney, Agent, or Firm* — Michael Best & Friedrich LLP

(57) ABSTRACT

A knife holder is adapted for retention of a plurality of knives, and includes a main body, a lateral wall, a locking member, a locking head and a plurality of insertion holes. The main body cooperates with the lateral wall to define an insertion space. The locking member has a linkage rod having a plurality of protruding portions, and a plurality of locking plates respectively connected to the protruding portions. Movement of the linkage rod drives each locking plate to rotate between a locked position, where a lock end portion thereof extends into the insertion space for blocking removal of the knives via the insertion holes, and an unlocked position, where the lock end portion is received in the receiving space for permitting removal of the knives.

8 Claims, 5 Drawing Sheets

KNIFE HOLDER

CROSS-REFERENCE TO RELATED APPLICATION

This application claims priority of Chinese Patent Application No. 201720214037.3, filed on Mar. 7, 2017.

FIELD

The disclosure relates to a knife holder, and more particularly to a knife holder adapted for retaining and locking a plurality of knives therein.

BACKGROUND

Taiwanese Design Patent No. D171405 discloses a conventional knife holder, which includes a plurality of insertion holes respectively adapted for insertion of a plurality of knives. Since the conventional knife holder is not equipped with a locking mechanism, the knives can be readily drawn from the conventional knife holder, which may be dangerous to anyone nearby.

SUMMARY

Therefore, an object of the disclosure is to provide a knife holder that can alleviate at least one of the drawbacks associated with the abovementioned prior art.

Accordingly, the knife holder is adapted for retention of a plurality of knives. Each of the knives has a blade. The knife holder includes a base seat unit and a locking unit. The base seat unit has a main body, at least one lateral wall, and a plurality of insertion holes. The main body has opposite top and bottom surfaces, opposite lateral surfaces, and a receiving space. Each of the lateral surfaces is connected between a respective one of opposite longitudinal edges of the top surface and a respective one of opposite longitudinal edges of the bottom surface. The receiving space is disposed between the top and bottom surfaces, and is adjacent to the top surface. The at least one lateral wall is connected to at least one of the lateral surfaces of the main body, cooperates with the at least one of the lateral surfaces of the main body to define an insertion space therebetween, and has a top end surface corresponding in position to the top surface of the main body. The insertion space is in communication with the receiving space. Each of the insertion holes has opposite end sections respectively formed in the top surface of the main body and the top end surface of the at least one lateral wall, and an intermediate section overlapping a top portion of the insertion space. Each of the insertion holes is adapted for insertion of the blade of a corresponding one of the knives therethrough. The locking unit includes a locking member and a locking head. The locking member includes a linkage rod and a plurality of locking plates. The linkage rod is disposed in the receiving space, is movable and extends in a longitudinal direction, and has a plurality of protruding portions. Each of the locking plates has a connecting portion pivotally connected to the main body, and a lock end portion extending from the connecting portion. The locking head is disposed on the main body, is connected to the locking member, and is operable to drive movement of the linkage rod in the longitudinal direction. The protruding portions of the linkage rod are configured to be connected respectively to the locking plates, such that the movement of the linkage rod in the longitudinal direction drives each of the locking plates to rotate relative to the main body between a locked position, where the lock end portion extends into the insertion space for blocking removal of the blade of a respective one of the knives from the insertion space through a corresponding one of the insertion holes, and an unlocked position, where the lock end portion is received in the receiving space of the main body for permitting the removal of the blade of the respective one of the knives from the insertion space.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
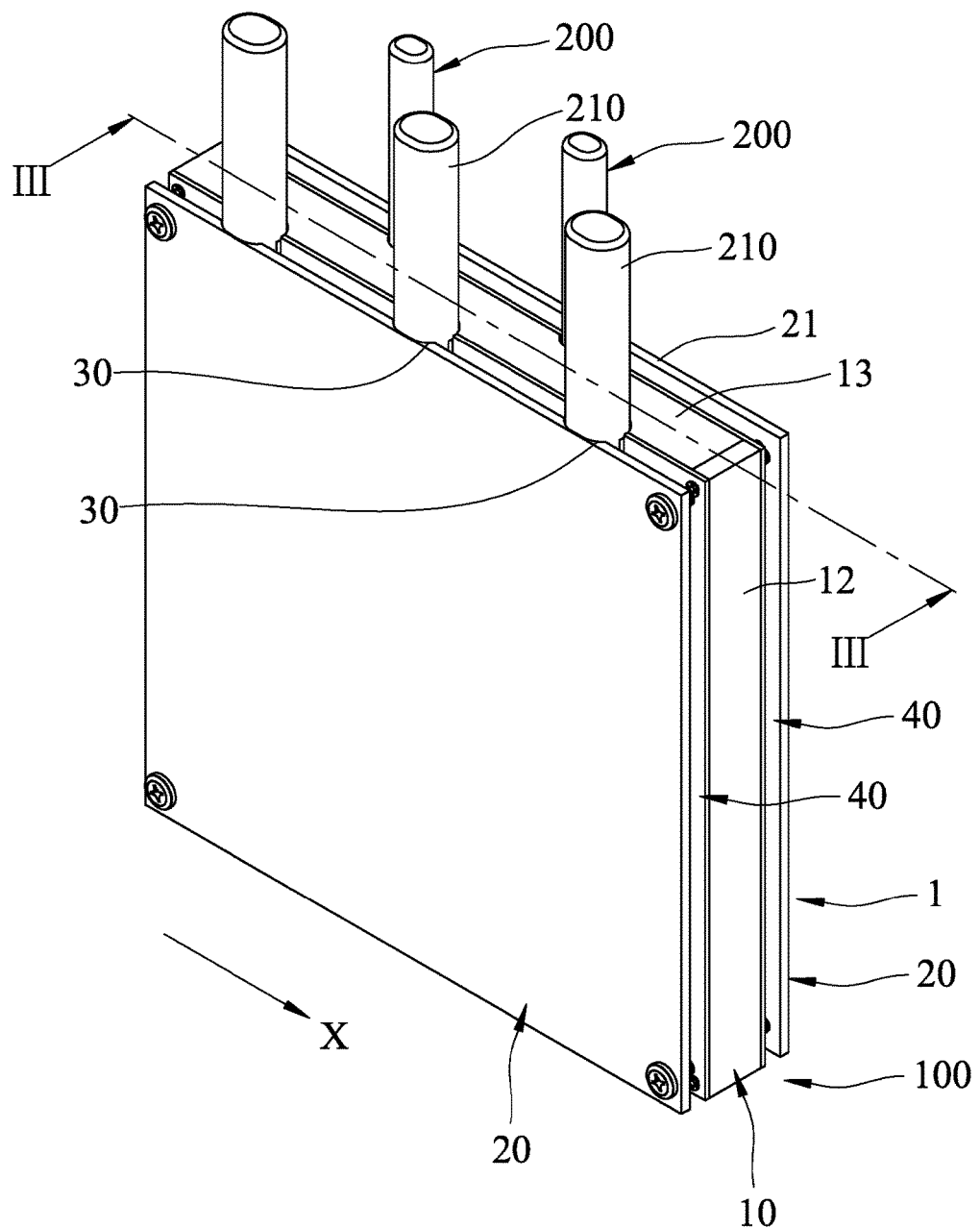
FIG. 1 is a perspective view of an embodiment of a knife holder according to the present disclosure.
Figure 2:
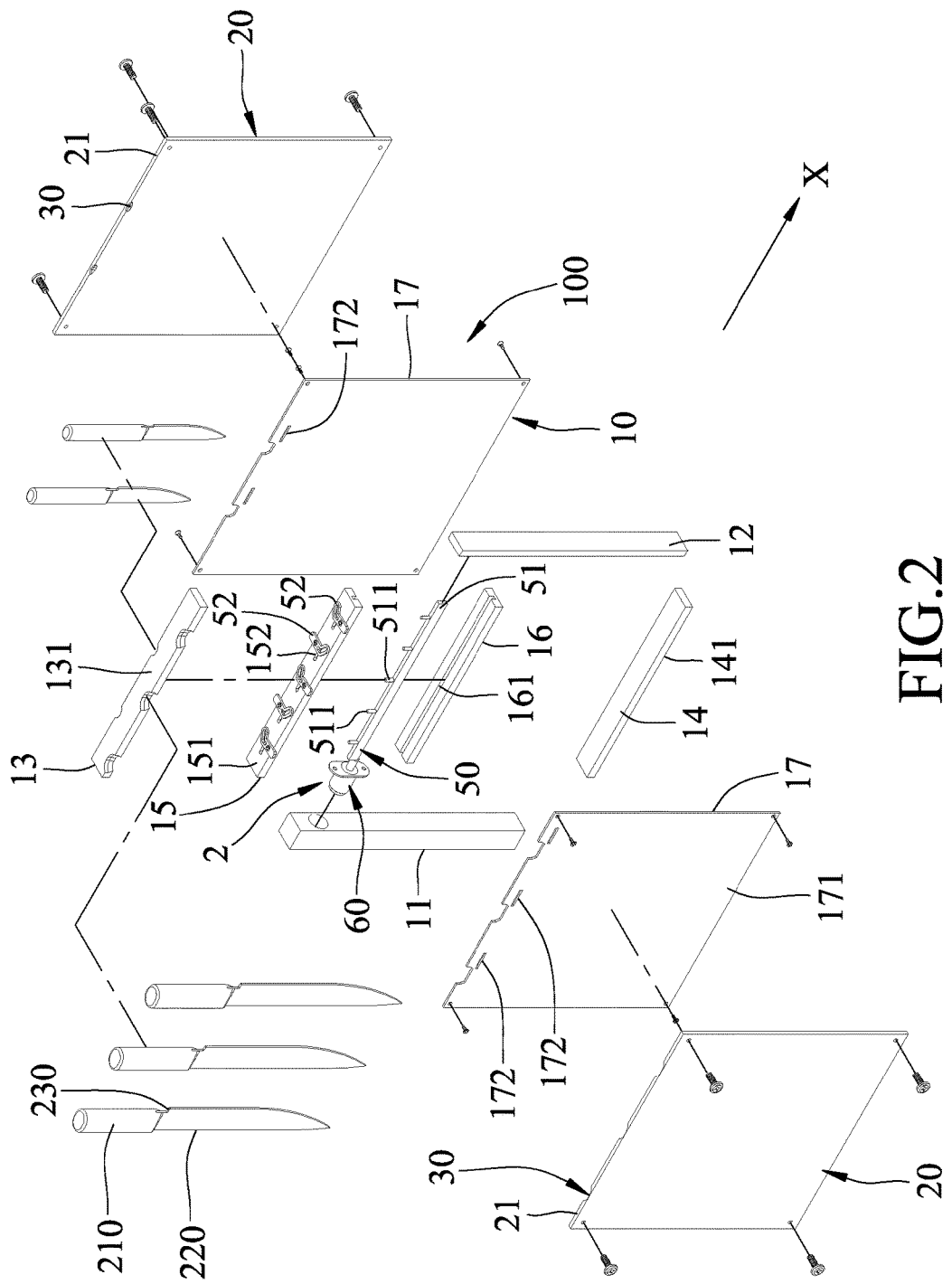
FIG. 2 is an exploded perspective view of the embodiment.
Figure 3:
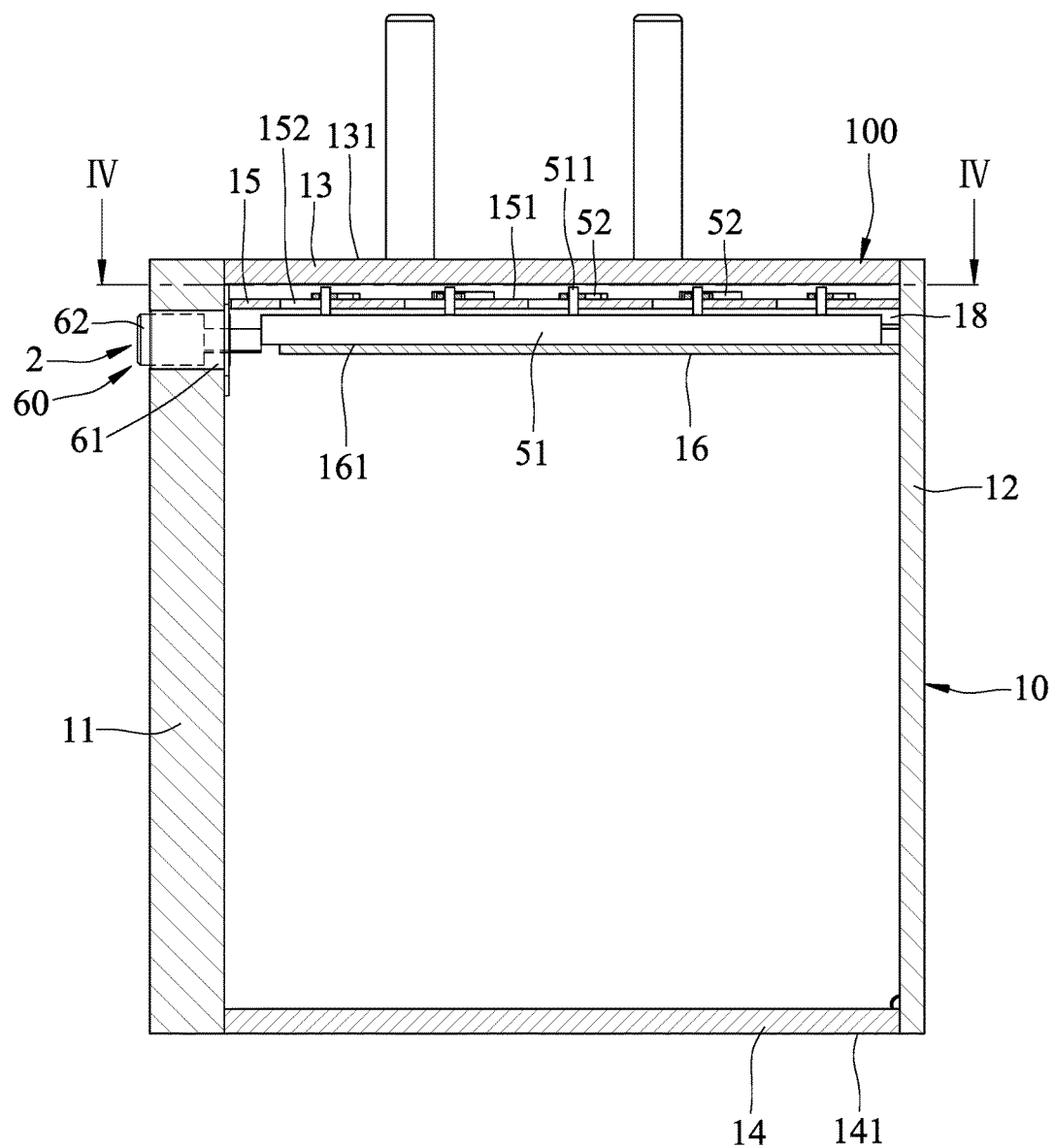
FIG. 3 is a sectional view taken along line III-III in FIG. 1.

Referring to FIGS. 1 to 3, an embodiment of a knife holder 100 according to the present disclosure is adapted for retention of a plurality of knives 200. Each of the knives has a handle 210 and a blade 220. The blade 220 has an edge 230 that is adjacent to and transverse to the handle 210. The knife holder 100 has a base seat unit 1 and a locking unit 2.

In this embodiment, the base seat unit 1 has a main body 10, two lateral walls 20, and a plurality of insertion holes 30. The main body 10 has a first upright wall 11, a second upright wall 12, opposite top and bottom walls 13, 14, opposite upper and lower supporting walls 15, 16, and opposite inner walls 17. The second upright wall 12 is spaced apart from the first upright wall 11 in a longitudinal direction (X). The top and bottom walls 13, 14 extend in the longitudinal direction (X) and are connected between the first and second upright walls 11, 12. The top wall 13 has a top surface 131. The bottom wall 14 has a bottom surface 141. The top surface 131 of the top wall 13 and the bottom surface 141 of the bottom wall 14 serve respectively as opposite top and bottom surfaces of the main body 10. The main body 10 further has a receiving space 18 formed between the top and bottom surfaces 131, 141, and is adjacent to the top surface 131.

The upper and lower supporting walls 15, 16 extend in the longitudinal direction (X) and are disposed between the top and bottom walls 13, 14. The receiving space 18 is defined between the upper and lower supporting walls 15, 16. The upper supporting wall 15 is adjacent to the top wall 13, and is formed with a plurality of guide grooves 152 extending in the longitudinal direction (X) (see FIG. 4) and communicating with the receiving space 18. The lower supporting wall 16 has a rail groove 161 extending in the longitudinal direction (X). Each of the inner walls 17 is connected to the first and second upright walls 11, 12 and the top and bottom walls 13, 14, and is formed with a plurality of through holes 172 extending in the longitudinal direction (X). Each of the inner walls 17 has a lateral surface 171 facing outwardly. The lateral surfaces 171 of the inner walls 17 serve respectively as opposite outer side surfaces of the main body 10. Each of the lateral surfaces 171 of the inner walls 17 is connected between a respective one of opposite longitudinal edges of the top surface 131 and a respective one of opposite longitudinal edges of the bottom surface 141.

The lateral walls 20 are respectively connected to the inner walls 17. Specifically, each of the lateral walls 20 is positioned relative to the lateral surface 171 of a respective one of the inner walls 17 via a plurality of supporting components provided at corners thereof, and cooperates with the lateral surface 171 of the respective one of the inner walls 17 to define an insertion space 40 therebetween. Each of the insertion spaces 40 is in communication with the receiving space 18 through the through holes 172 of a corresponding one of the inner walls 17. Each of the lateral walls 20 has a top end surface 21 that corresponds in position to the top surface 131 of the top wall 13 of the main body 10.

Each of the insertion holes 30 is adapted for insertion of the blade 220 of a corresponding one of the knives 200. Each of the insertion holes 30 has opposite end sections. One of the opposite end sections of each of the insertion holes 30 extends from the top surface 131 of the top wall 13 to a corresponding one of the inner walls 17. The other one of the opposite end sections of each of the insertion holes 30 is formed in the top end surface 21 of a corresponding one of the lateral walls 20. Each of the insertion holes 30 further has an intermediate section that interconnects the opposite end sections, and that overlaps a top portion of a corresponding one of the insertion spaces 40.

The locking unit 2 includes a locking member 50 and a locking head 60. The locking member 50 has a linkage rod 51 and a plurality of locking plates 52. The linkage rod 51 is disposed in the receiving space 18, extends and is movable in the longitudinal direction (X), and has a plurality of protruding portions 511. Specifically, the linkage rod 51 is disposed in the rail groove 161 of the lower supporting wall 16, and is slidable along the rail groove 161 during movement of the linkage rod in the longitudinal direction (X).

Figure 4:
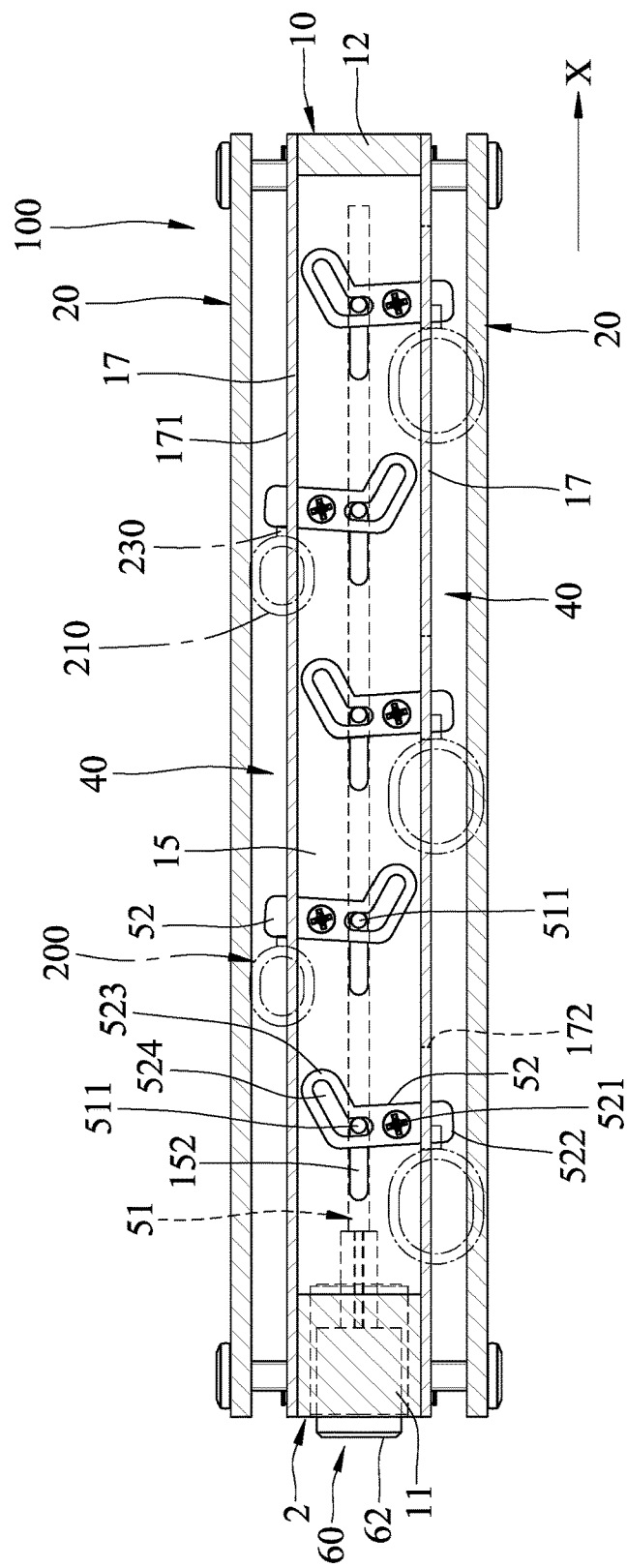
FIG. 4 is a sectional view taken along line IV-IV in FIG. 3, illustrating a plurality of locking plates of the embodiment each being in a locked position.

Referring further to FIG. 4, each of the locking plates 52 has a connecting portion 521 pivotally connected to an upper surface 151 of the upper supporting wall 15 of the main body 10, a lock end portion 522 extending from the connecting portion 521, and a substantially L-shaped link portion 523 extending from the connecting portion 521, being opposite to the lock end portion 522, and formed with a substantially L-shaped slot 524 that extends therealong.

The protruding portions 511 of the linkage rod 51 are connected respectively to the locking plates 52. Specifically, each of the protruding portions 511 of the linkage rod 51 extends upwardly into the slot 524 of a respective one of the locking plates 52 through a respective one of the guide grooves 152, and is slidable along the slot 524 of the respective one of the locking plates 52 and the respective one of the guide grooves 152.

In this embodiment, the locking head 60 of the locking unit 2 is a push lock. The locking head 60 has a case portion 61 secured to the first upright wall 11 of the main body 10, and a core portion 62 connected to the linkage rod 51 of the locking member 50, and co-movable with the linkage rod 51 in the longitudinal direction (X) relative to the case portion 61. The locking head 60 is operable to drive the movement of the linkage rod 51 in the longitudinal direction (X), which drives each of the locking plates 52 to rotate relative to the main body between a locked position (see FIG. 4) and an unlocked position (see FIG. 5). Since the configuration of the locking head 60 is known in the art (as disclosed in, for example, Taiwanese Utility Patent Nos. M293303, M389755, and M428225), further details on the same are omitted herein for the sake of brevity.

Referring to FIG. 4, in use, when the locking head 60 is operated with the core portion 62 being pressed relative to the case portion 61, the linkage rod 51 is moved in the longitudinal direction (X) while the protruding portions 511 of the linkage rod 51 respectively slide along the guide grooves 152 and the slots 524 to drive rotation of each of the locking plates 52 to the locked position. At this time, for each of the locking plates 52, the lock end portion 522 extends into a corresponding one of the insertion spaces 40 through a respective one of the through holes 172 for blocking removal of the blade 220 of a corresponding one of the knives 200 from the corresponding one of the insertion spaces 40 through a corresponding one of the insertion holes 30 (i.e., if each of the knives 200 is to be pulled out from the corresponding one of the insertion holes 30, the edge 230 of the blade 220 will be blocked by the lock end portion 522 of the respective one of the locking plates 52), thereby securing the knives 200 in the knife holder 100.

Figure 5:
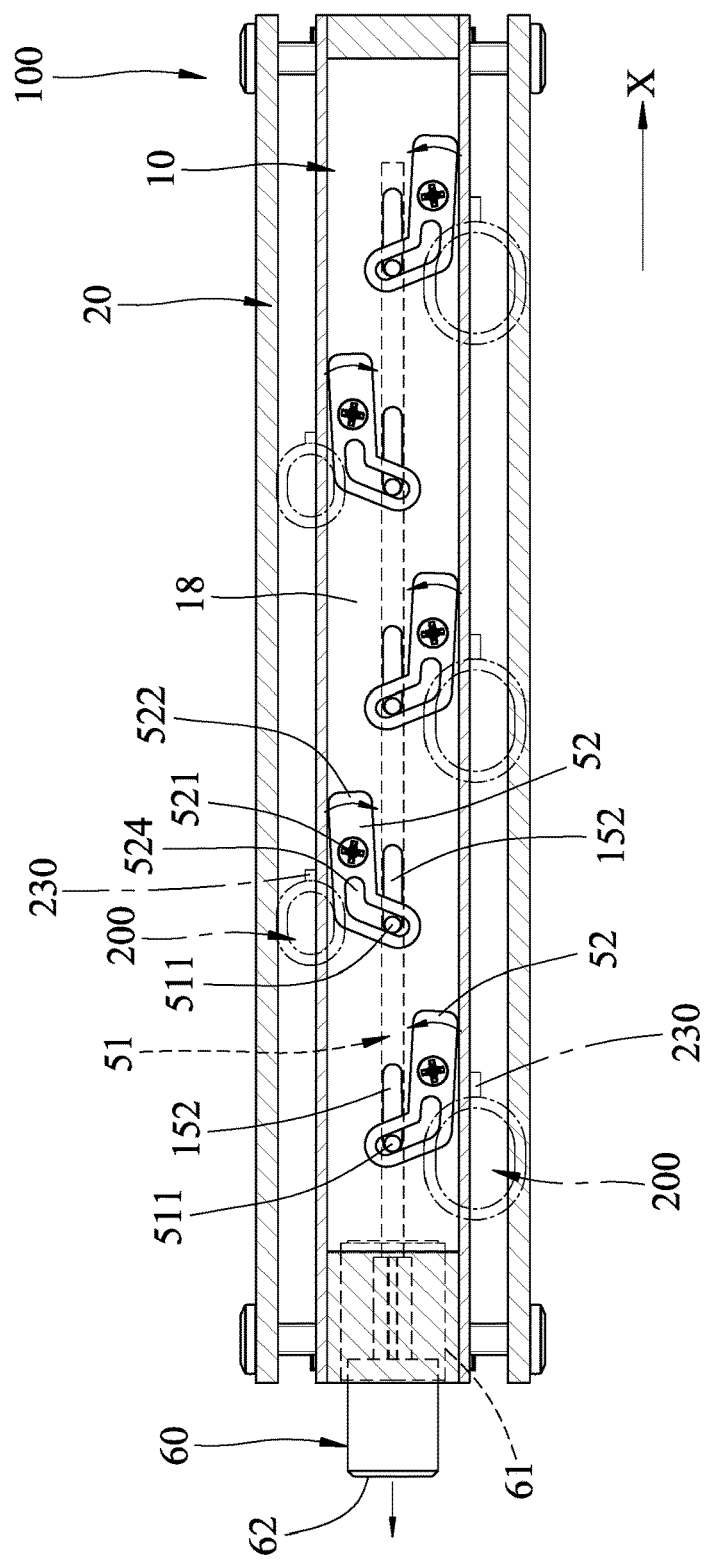
FIG. 5 is a view similar to FIG. 4, but illustrating the locking plates each being in an unlocked position.

Referring to FIG. 5, when intending to remove the knives 200 from the knife holder 100 of the present disclosure, a user first needs to open the locking head 60 with a key (not shown), so as to allow the core portion 62 of the locking head 60 to protrude outwardly relative to the case portion 61 of the locking head 60. As a result, the linkage rod 51 slides along the rail groove 161 of the lower supporting wall 16 via movement of the case portion 62 with the protruding portions 511 respectively sliding along the guide grooves 152, such that each of the locking plates 52 is rotated reversely from the locked position to the unlocked position, where the lock end portion 522 of each of the locking plates 52 is withdrawn from the respective one of the through holes 172 and received in the receiving space 18 of the main body 10 for permitting removal of the blade 220 of the corresponding one of the knives 200 from the corresponding one of the insertion spaces 40.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that his disclosure is not limited to the disclosed embodiment but is intended to cover various arrangements included within the spirit and scope of the broadest interpretation so as to encompass all such modifications and equivalent arrangements.

What is claimed is:

1. A knife holder adapted for retention of a plurality of knives, each of the knives having a blade, said knife holder comprising:
 a base seat unit having
  a main body that has
   opposite top and bottom surfaces, opposite lateral surfaces, each of which is connected between a respective one of opposite longitudinal edges of said top surface and a respective one of opposite longitudinal edges of said bottom surface, and
a receiving space disposed between said top and bottom surfaces, and being adjacent to said top surface,
at least one lateral wall that is connected to at least one of said lateral surfaces of said main body, that cooperates with said at least one of said lateral surfaces of said main body to define an insertion space therebetween, and that has a top end surface that corresponds in position to said top surface of said main body, said insertion space being in communication with said receiving space, and
a plurality of insertion holes, each of which has opposite end sections respectively formed in said top surface of said main body and said top end surface of said at least one lateral wall, and an intermediate section overlapping a top portion of said insertion space, each of said insertion holes being adapted for insertion of the blade of a corresponding one of the knives therethrough; and
a locking unit including
a locking member that includes
a linkage rod disposed in said receiving space, extending in a longitudinal direction, movable in the longitudinal direction, and having a plurality of protruding portions, and
a plurality of locking plates, each of said locking plates having a connecting portion that is pivotally connected to said main body, and a lock end portion that extends from said connecting portion, and
a locking head that is disposed on said main body, that is connected to said locking member, and that is operable to drive movement of said linkage rod in the longitudinal direction, said protruding portions of said linkage rod being configured to be connected respectively to said locking plates, such that the movement of said linkage rod in the longitudinal direction drives each of said locking plates to rotate relative to said main body between a locked position, where said lock end portion extends into said insertion space for blocking removal of the blade of a corresponding one of the knives from said insertion space through a corresponding one of said insertion holes, and an unlocked position, where said lock end portion is received in said receiving space of said main body for permitting the removal of the blade of the respective one of the knives from said insertion space.

2. The knife holder as claimed in claim 1, wherein:
said main body of said base seat unit further has a plurality of guide grooves extending in the longitudinal direction and communicating with said receiving space;
each of said locking plates further has a substantially L-shaped link portion extending from said connecting portion, being opposite to said lock end portion and formed with a substantially L-shaped slot which extends therealong; and
each of said protruding portions extends into said slot of a respective one of said locking plates through a respective one of said guide grooves, and is slidable along said slot of the respective one of said locking plates and the respective one of said guide grooves.

3. The knife holder as claimed in claim 1, wherein:
said main body of said base seat unit further has
a first upright wall,
a second upright wall spaced apart from said first upright wall in the longitudinal direction,
opposite top and bottom wall extending in the longitudinal direction, connected between said first and second upright walls, said top surface being formed on said top wall, said bottom surface being formed on said bottom wall, and
opposite upper and lower supporting walls extending in the longitudinal direction and disposed between said top and bottom walls, said upper supporting wall being adjacent to said top wall and being formed with said guide grooves;
said receiving space of said main body is defined between said upper and lower supporting walls; and
said linkage rod of said locking member is movably disposed between said upper and lower supporting walls.

4. The knife holder as claimed in claim 3, wherein said locking head of said locking unit is a push lock and has:
a case portion secured to said first upright wall of said main body; and
a core portion connected to said linkage rod of said locking member, and co-movable with said linkage rod in the longitudinal direction relative to said case portion.

5. The knife holder as claimed in claim 3, wherein said base seat unit includes two of said lateral walls respectively connected to said lateral surfaces of said main body, and cooperating with said main body to define two of said insertion spaces, each of said insertion spaces being disposed between a respective one of said lateral walls and a respective one of said lateral surfaces of said main body.

6. The knife holder as claimed in claim 5, wherein:
said main body of said base seat unit further has opposite inner walls, each of said inner walls being connected to said first and second upright walls and said top and bottom walls, and;
said lateral surfaces are respectively formed on said inner walls; and
each of said inner walls is formed with a plurality of through holes extending in the longitudinal direction, said lock end portions of said locking plates extending respectively through said through holes of said inner walls into said insertion spaces when each of said locking plates is in the locked position.

7. The knife holder as claimed in claim 6, wherein:
one of said opposite end sections of each of said insertion holes extends from said top surface of said top wall to a corresponding one of said inner walls; and
the other one of said opposite end sections of each of said insertion holes is formed in said top end surface of a corresponding one of said lateral walls.

8. The knife holder as claimed in claim 3, wherein:
said lower supporting wall of said main body has a rail groove extending in the longitudinal direction; and
said linkage rod of said locking member is disposed in said rail groove, and slidable along said rail groove during the movement of said linkage rod in the longitudinal direction for moving each of said lock plates between the locked and unlocked positions.

* * * * *